(12) United States Patent
Das et al.

(10) Patent No.: US 8,555,136 B2
(45) Date of Patent: Oct. 8, 2013

(54) OPTIMIZED DECODING IN A RECEIVER

(75) Inventors: Soumya Das, San Diego, CA (US); Ashok Mantravadi, San Diego, CA (US); Ravishanker Mudigonda, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1469 days.

(21) Appl. No.: 11/828,338

(22) Filed: Jul. 25, 2007

(65) Prior Publication Data

US 2009/0031201 A1 Jan. 29, 2009

(51) Int. Cl.
*H03M 13/00* (2006.01)
(52) U.S. Cl.
USPC .......................... 714/758; 714/774; 714/807
(58) Field of Classification Search
USPC .......................................... 714/758, 807, 774
See application file for complete search history.

(56) References Cited

U.S. PATENT DOCUMENTS 5,699,365 A * 12/1997 Klayman et al. ............. 714/708
6,735,734 B1 * 5/2004 Liebetreu et al. ............. 714/775
2005/0268205 A1 12/2005 Rhee et al.
2006/0078836 A1 4/2006 Kim et al.
2007/0000627 A1 1/2007 Tan et al.
2008/0086671 A1 * 4/2008 Garg et al. .................... 714/752
2011/0072482 A1 * 3/2011 Lau ............................... 725/116

FOREIGN PATENT DOCUMENTS

| KR | 20050114162 A | 12/2005 |
| WO | WO2006062040 A1 | 6/2006 |
| WO | 2006078836 | 7/2006 |
| WO | WO2006078836 | 7/2006 |
| WO | 2007000627 | 1/2007 |

OTHER PUBLICATIONS

International Preliminary Report on Patentability, PCT/US2008/071232, International Bureau, The International Bureau of WIPO, Feb. 4, 2010.
International Search Report and Written Opinion—PCT/US2008/071232—ISA/EPO—Apr. 23, 2009.
Taiwan Search Report—TW097128525—TIPO—Nov. 8, 2011.

* cited by examiner

*Primary Examiner* — Guy Lamarre
(74) *Attorney, Agent, or Firm* — Fulbright & Jaworski LLP

(57) ABSTRACT

A receiver includes a decoder configured to decode at least a portion of a data stream comprising a data frame. The data frame includes a code block having a data block and a parity block. The receiver also includes a controller. The controller is configured to determine whether to disable at least a portion of the receiver during transmission of the parity block to the receiver when the data block contains at least one erasure.

30 Claims, 8 Drawing Sheets

OPTIMIZED DECODING IN A RECEIVER

BACKGROUND

I. Field

The present disclosure relates generally to communications, and more specifically techniques for optimizing decoding in a receiver.

II. Background

Recent advances in technology has drastically increased the capabilities of wireless communication devices. Today, many wireless communication devices provide, in addition to tradition telephony services, a means for viewing multimedia broadcasts in a mobile environment. Various broadcast systems are currently being deployed and/or developed to efficiently and economically distribute multimedia content to millions of wireless communication devices. These broadcast systems allow users to access multiple channels of content on a wireless communications device typically used for traditional cellular voice and data services.

The multimedia content broadcast on each channel is often referred to as a service. Each service may includes one or more data streams. By way of example, a typical multimedia program may include a video data stream, an audio data stream, and a signaling data stream. In these broadcast systems, a data stream may be sent as two sub-streams: a base stream and an enhancement stream. This technique is often referred to as "layered" coding. The base stream may carry base information for all wireless devices, and the enhancement stream may carry additional information for wireless devices observing better channel conditions. With layered coding, the base and enhancement streams are encoded and modulated separately and then combined to obtain a data symbol stream.

The encoding of the base and enhancement streams may include forward error correction (FEC). FEC is a signal processing technique that adds redundancy to the transmitted data streams using a predetermined algorithm. The added redundancy allows the receiver to detect and possibly correct errors in the transmitted data streams. Frequently, concatenated data encoding schemes are used to provide powerful error correction capability. By way of example, a data stream may be protected by a block code, such as Reed-Solomon code or the like, and then turbo encoded. In this example, the data stream is provided to a Reed-Solomon encoder in blocks. For each data block, the Reed-Solomon encoder appends a parity block to form a code block. Each code block is then provided to a turbo encoder to produce a stream of code symbols. The code symbols are blocked together and mapped to points on a signal constellation, thereby producing a stream of modulation symbols. The modulation symbol stream is provided to an analog front end (AFE), which generates a continuous time signal, which is transmitted over a communications channel.

At the receiver, a symbol demapper is used to make "soft decisions" as to which modulation symbols were most likely transmitted based on the received points in the signal constellation. The soft decisions are provided to a turbo decoder to recover the code blocks that were originally transmitted. A Reed-Solomon decoder processes each code block in an attempt to correct errors and recover the data stream.

A block code, such as Reed-Solomon, is generally specified using the following notation: Reed-Solomon (n,k). This means that the Reed-Solomon encoder receives a data block having k data packets and adds a parity block to produce a code block having n packets. A Reed-Solomon decoder can correct up to n−k packets (i.e., the number of packets in the parity block). Accordingly, there may be times in broadcasts using a layered coding scheme where the packet errors in the enhancement stream exceed the capability of the block code, but the base stream has no error. In these situations, processing resources may be saved by skipping the block decoding of the enhancement stream.

SUMMARY

In one aspect of the disclosure, a receiver includes a decoder configured to decode at least a portion of a data stream comprising a data frame. The data frame includes a code block having a data block and a parity block. The receiver further includes a controller configured to determine whether to disable at least a portion of the receiver during transmission of the parity block to the receiver when the data block contains at least one erasure.

In another aspect of the disclosure, a receiver includes means for decoding at least a portion of a data stream comprising a data frame. The data frame includes a code block having a data block and a parity block. The receiver further includes means for determining whether to disable at least a portion of the receiver during transmission of the parity block to the receiver when the data block contains at least one erasure.

In a further aspect of the disclosure, a method of processing a data stream at a receiver includes decoding at least a portion of the data stream. The data stream includes a data frame, and the data frame includes a code block having a data block and a parity block. The method further includes determining whether to disable at least a portion of the receiver during transmission of the parity block to the receiver when the data block contains at least one erasure.

In yet a further aspect of the disclosure, machine-readable medium comprises instructions executable by one or more processors in a receiver, the instructions include code to decode at least a portion of a data stream comprising a data frame, wherein the data frame includes a code block having a data block and a parity block. The instructions further include code to determine whether to disable at least a portion of the receiver during transmission of the parity block to the receiver when the data block contains at least one erasure.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

The various techniques described throughout this disclosure may be used for wireless and wireline communication systems employing any number of different multiple access schemes including, by way of example, time division multiplexing (TDM), frequency division multiplexing (FDM), code division multiplexed (CDM), orthogonal frequency division multiplexing (OFDM), or some other construct. For clarity of presentation, these techniques will be described below for an exemplary wireless communications system employing a specific concatenated coding scheme, a specific frame structure, and a specific transmission scheme.

Figure 1:
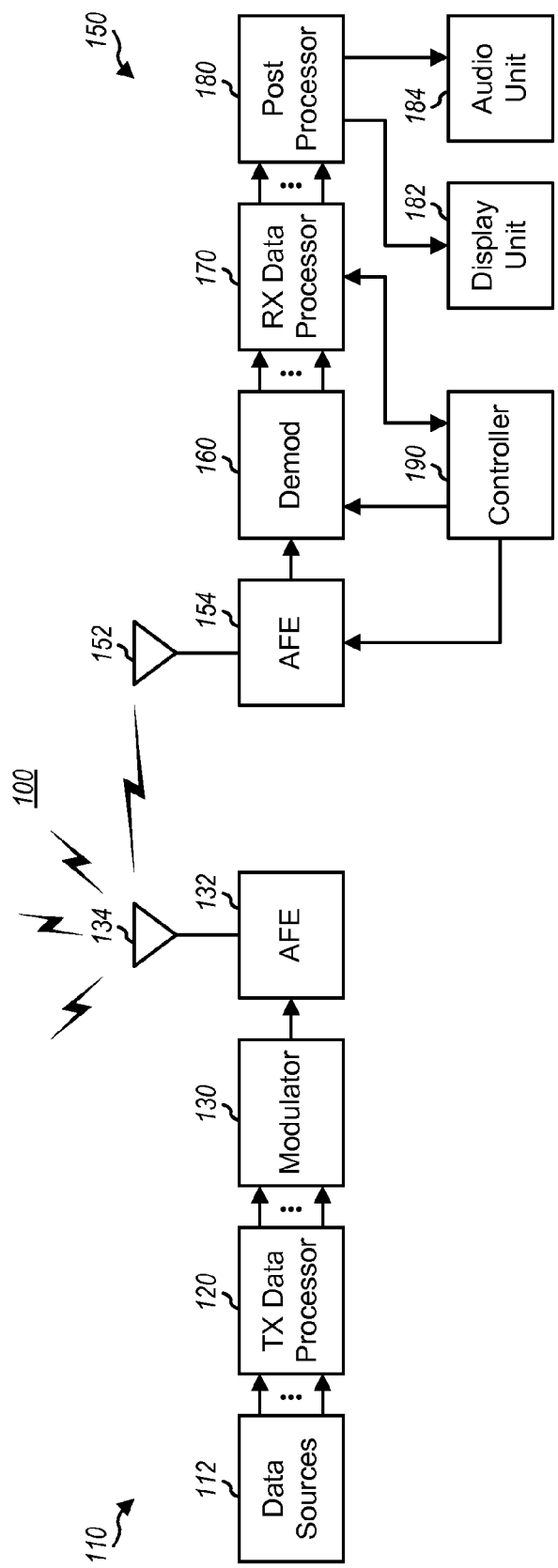
FIG. 1 is a conceptual block diagram illustrating an example of a transmitter and receiver in a communications system.

FIG. 1 is a conceptual block diagram illustrating an example of a transmitter 110 and receiver 150 in a communications system 100. In this example, the transmitter 110 is a fixed-site station designed to provide broadcast services to a large number of mobile subscribers. The transmitter 110 may be alternatively referred to by those skilled in the art as a transmitter station, base station, base transceiver station, access point, node, or some other terminology to identify a device or entity capable of performing some or all of the transmitter functions described throughout this disclosure.

The receiver 150, in this example, may be a fixed or mobile device in which a user within the coverage region of the transmitter 110 can receive broadcast services. By way of example, the receiver 150 may be a cellular phone, a personal digital assistant (PDA), a portable television, a personal computer, a laptop computer, a digital camera, a digital camcorder, a game console, a portable audio device, a portable radio, or any other suitable device capable of receiving a broadcast. The receiver 150 may be alternatively referred to by those skilled in the art as a handset, wireless device, access terminal, user terminal, user equipment, mobile station, subscriber station, or some other terminology to identify a device or entity capable of performing some or all of the receiver functions described throughout this disclosure.

The broadcast services provided by the transmitter 110 to the wireless devices within a coverage region may utilize any suitable air interface. One non-limiting example of an air interface is OFDM. OFDM is a multi-carrier modulation technique that effectively partitions the overall system bandwidth into multiple N sub-carriers. These sub-carriers, which are also referred to as tones, bins, frequency channels, etc., are spaced apart at precise frequencies to provide orthogonality. Multimedia content may be modulated onto the sub-carriers by adjusting each sub-carrier's phase, amplitude or both. Typically, quadrature phase shift keying (QPSK) or quadrature amplitude modulation (QAM) is used, but other modulation schemes may also be used.

Figure 2:
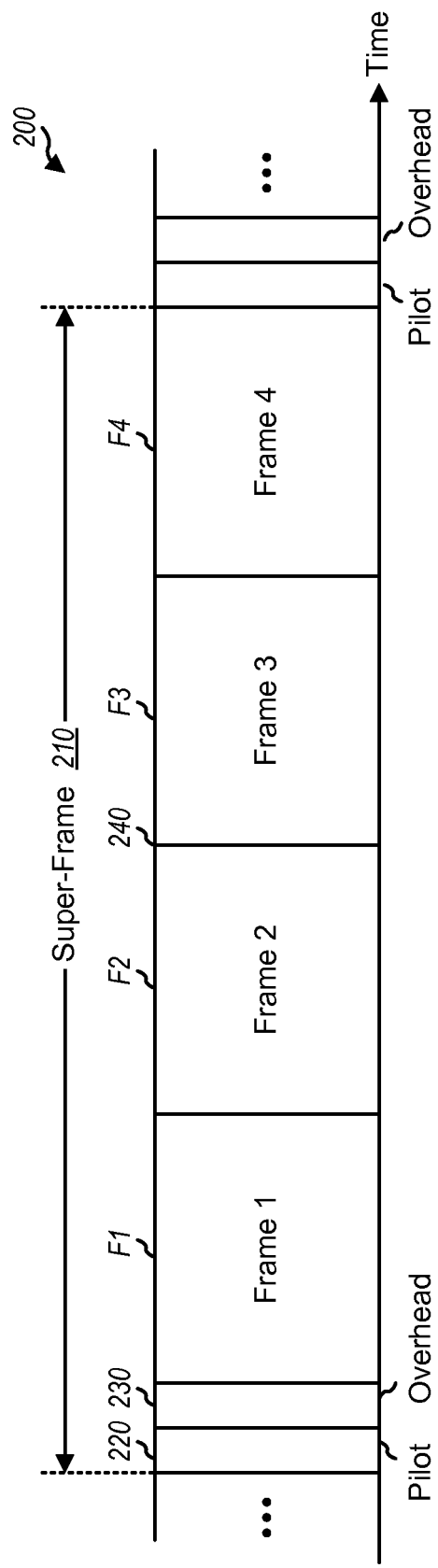
FIG. 2 is a conceptual diagram illustrating an example of a frame structure that may be used as part of an OFDM air interface between the transmitter and the receiver.

FIG. 2 is a conceptual diagram illustrating an example of a frame structure that may be used as part of an OFDM air interface between the transmitter and the receiver. This frame structure is often referred to as a "super-frame," but may also be referred as a frame, time slot, or some other terminology. The frame 210 includes four equal size sub-frames F1-F4 for broadcasting multimedia content. Each sub-frame F1-F4 is further divided into time slots, with each time slot including one or more OFDM symbols. An OFDM symbol is a composite signal having N modulated sub-carriers. The frame 210 also includes a TDM pilot 230 and overhead information 240. The receiver uses the pilot for synchronization (e.g., frame detection, frequency error estimation, and timing acquisition) and possibly for channel estimation. The overhead information may indicate various parameters for the data streams being transmitted (e.g., the time-frequency location of each data stream within the frame).

Returning to FIG. 1, the transmitter 110 includes a transmitter (TX) data processor 120. The processor 120 receives multiple data streams from data sources 112 and processes (e.g., compresses, encodes, interleaves, and symbol maps) the data streams to generate corresponding streams of data symbols. A modulator 130 multiplexes the data symbols for all data streams with pilot and overhead symbols to generate a composite symbol stream. The modulator 130 then converts the composite symbol stream into N parallel streams and performs OFDM modulation on each set of N to produce a stream of OFDM symbols to an analog front end (AFE) 134. The AFE 134 converts the OFDM symbol stream into analog signals and further conditions (e.g., amplifies, filters, and frequency upconverts) the analog signals to generate a RF modulated signal. The AFE 132 then transmits the RF modulated signal from an antenna 134 to the receiver 150, as well as the other wireless devices in the communications system 100.

At the receiver 150, the RF modulated signal from transmitter 110 is received by an antenna 152 and provided to an AFE 154. The AFE 154 conditions (e.g., filters, amplifies, frequency downconverts, and digitizes) the received signal and provides a stream of samples. A demodulator 160 performs OFDM demodulation on the samples stream to recover data symbols for one or more data streams of interest (e.g., all data streams for a selected multimedia program), as well as the pilot and overhead symbols. The demodulator 160 further performs detection (e.g., equalization or matched filtering) on the recovered data symbols to obtain detected data symbols, which are estimates of the data symbols sent by transmitter 110. A receiver (RX) data processor 170 processes (e.g., symbol demaps, deinterleaves, decodes, and decompresses) the detected data symbols for each selected data stream and outputs data for that stream. A post processor 180 processes (e.g., converts to analog, filters, and amplifies) the data for the selected data streams and generates output signals suitable for presentation on an electronics display unit 182 (e.g., an LCD screen), an audio unit 184 (e.g., a loudspeaker), and/or other output devices.

A controller 190 is used in the receiver 150 to control the operation of the RX data processor 170 and the demodulator 160. In addition, the controller 190 may be used to enable and disable processing resources to conserve battery life in the wireless device.

Figure 3:
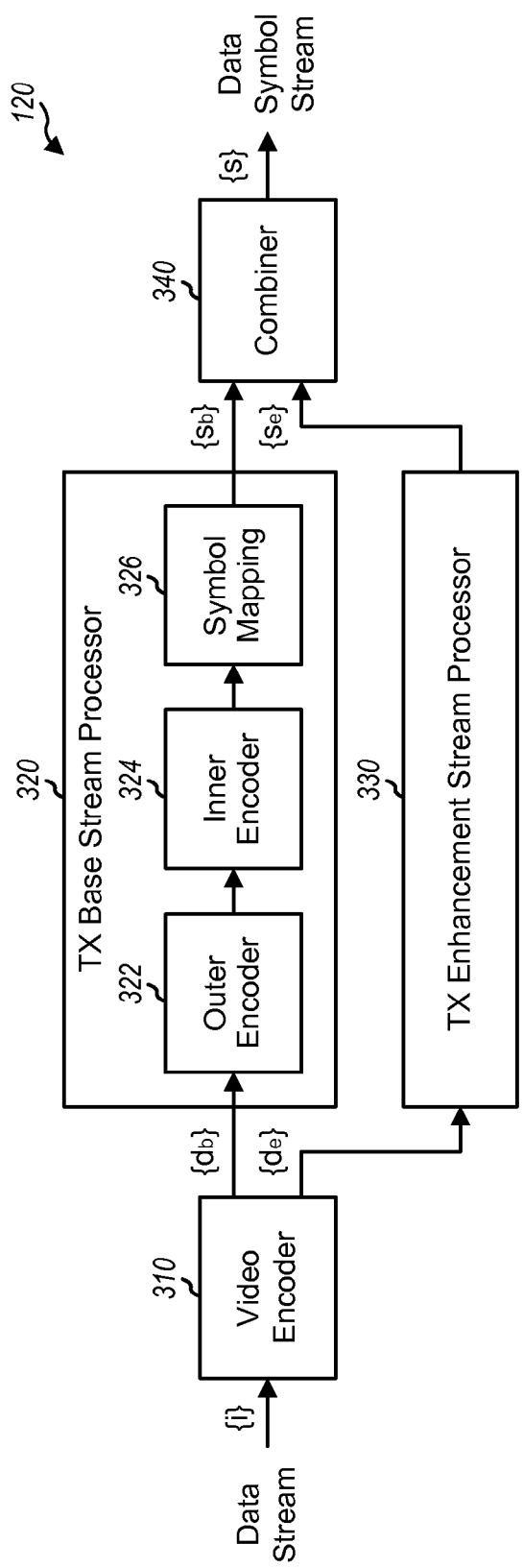
FIG. 3 is a conceptual block diagram illustrating an example of a TX data processor in the transmitter.

FIG. 3 is a conceptual block diagram illustrating an example of a TX data processor 120 at transmitter. For simplicity of presentation, FIG. 3 is limited to the processing of one video data stream for one multimedia program. Within TX data processor 320, a video encoder 310 receives and compresses a data stream {d} for the video portion of the multimedia program and provides a base data stream {$d_b$} and an enhancement data stream {$d_e$} for the video portion. The video encoder 310 may implement MPEG-2 (Moving Pictures Experts Groups) and may generate a sequence of intra-coded (I) frames, forward predicted (P) frames, and bi-directional predicted (B) frames for the video data stream. The base data stream {$d_b$} may carry I and P frames, and the enhancement data stream {$d_e$} may carry B and possibly P frames. In general, the video encoder 310 may implement any video compression scheme, and the base and enhancement streams may carry any type and combination of frames.

A TX base stream processor 320 receives and processes the base data stream {$d_b$}. Within processor 320, the base data stream {$d_b$} is divided into data blocks and provided to an outer encoder 322. Each data block includes k packets from the base data stream {$d_b$}. The outer encoder 322 generates and appends a parity block containing n–k parity packets to each data block to generate a series of code blocks, each containing n packets. The outer encoder 322 may also interleave (i.e., reorders) the code blocks within each sub-frame before providing the code blocks to an inner encoder 324. The inner encoder 324 may be implemented with, by way of example, a turbo encoder. The turbo encoder processes each packet separately, generating a turbo encoded packet containing series of code symbols for each bit in the original packet and a cyclic redundancy check (CRC). The code symbols in the turbo encoded packet are then blocked together and mapped to points on a signal constellation by a symbol mapper 326. The result is a base symbol stream {$s_b$} comprising a series of code blocks, each containing n turbo encoded packets.

A TX enhancement stream processor 330 processes the enhancement stream {$d_e$} to generate an enhancement symbol stream {$s_e$}, which also comprises a series of code blocks, each containing n turbo encoded packets. The processor 230 may use the same outer code, inner code, and modulation scheme used by the processor 320 for the base data stream, or different ones.

A combiner 340 receives and scales the base and enhancement symbol streams, and then combines them to generate a data symbol stream {s} for the video portion of the program. The gains determine the amount of transmit power (and thus the coverage areas) for the base and enhancement streams.

Figure 4:
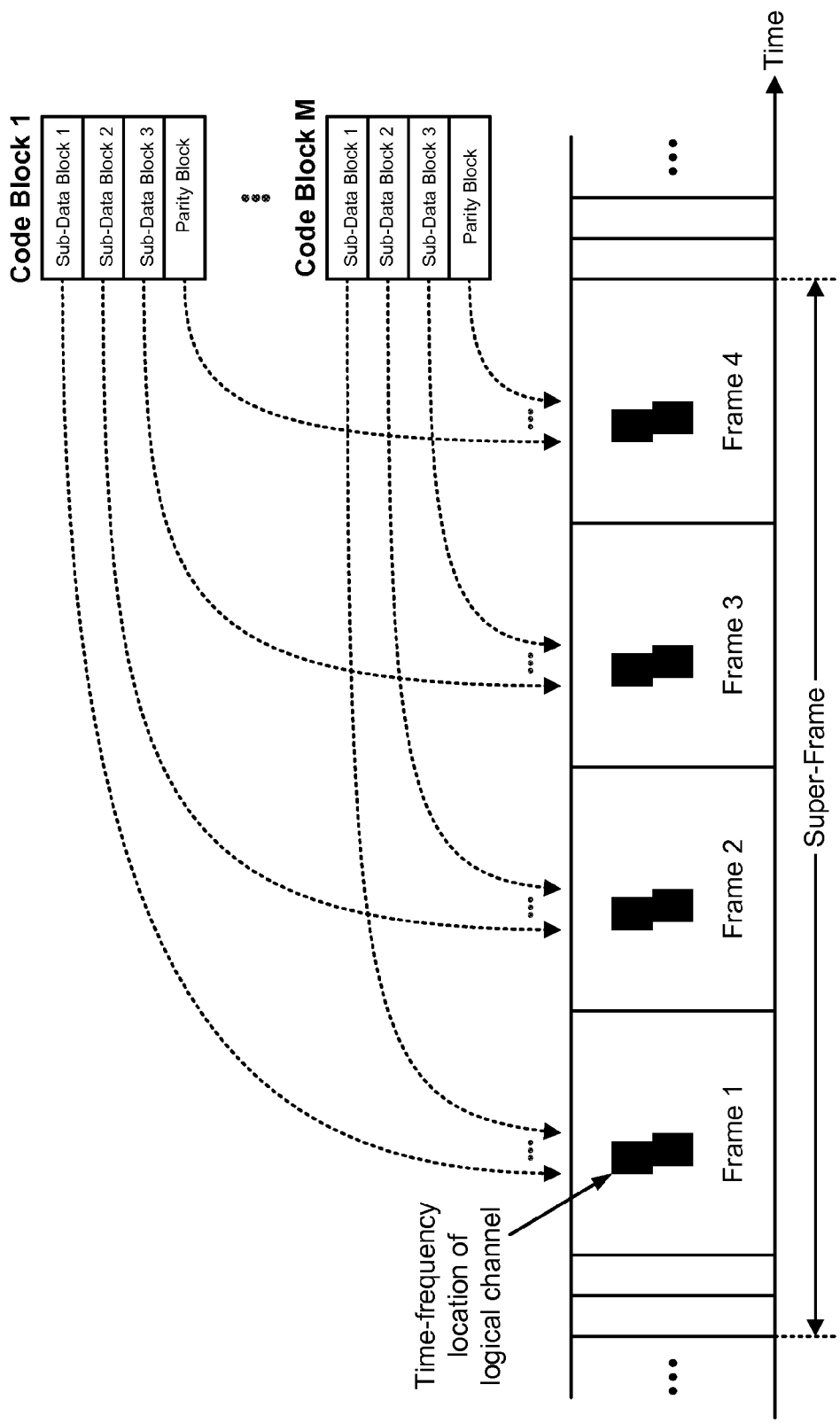
FIG. 4 is a conceptual block diagram illustrating an example of how the code blocks for a data symbol stream is carried in a frame.

The data symbol stream {s} comprises a series of code blocks, each containing n turbo encoded packets. Each turbo encoded packet contains modulation symbols from the base data stream superimposed with modulation symbols from the enhancement stream. An example showing the manner in which the code blocks for a data symbol stream is carried in a frame is illustrated in FIG. 4. In this example, a Reed-Solomon (16, 12) code is used, but the principles illustrated in connection with this example may be extended to other Reed-Solomon or block codes. In FIG. 4, M code blocks are transmitted on a logical channel in each frame. Each code block is partitioned into four sub-blocks. The first three sub-blocks in each of the M code blocks contains k turbo encoded packets with superimposed modulation symbols from the base and enhancement data streams. The fourth or final sub-block includes a parity block for the turbo encoded packets that precede it. The parity block contains n–k turbo encoded packets with superimposed parity symbols for the base and enhancement data streams. For each of the M code blocks, as shown in FIG. 4, the first sub-block is transmitted in the first sub-frame F1, the second sub-block is transmitted in the second sub-frame F2, the third sub-block is transmitted in the third sub-frame F3, and the fourth sub-block, or parity block, is transmitted in the fourth sub-frame F4. The positioning within each sub-frame, in terms of frequency and time, is based on the allocation within the frame 210 of the logical channel carrying the base and enhancement data streams.

Figure 5:
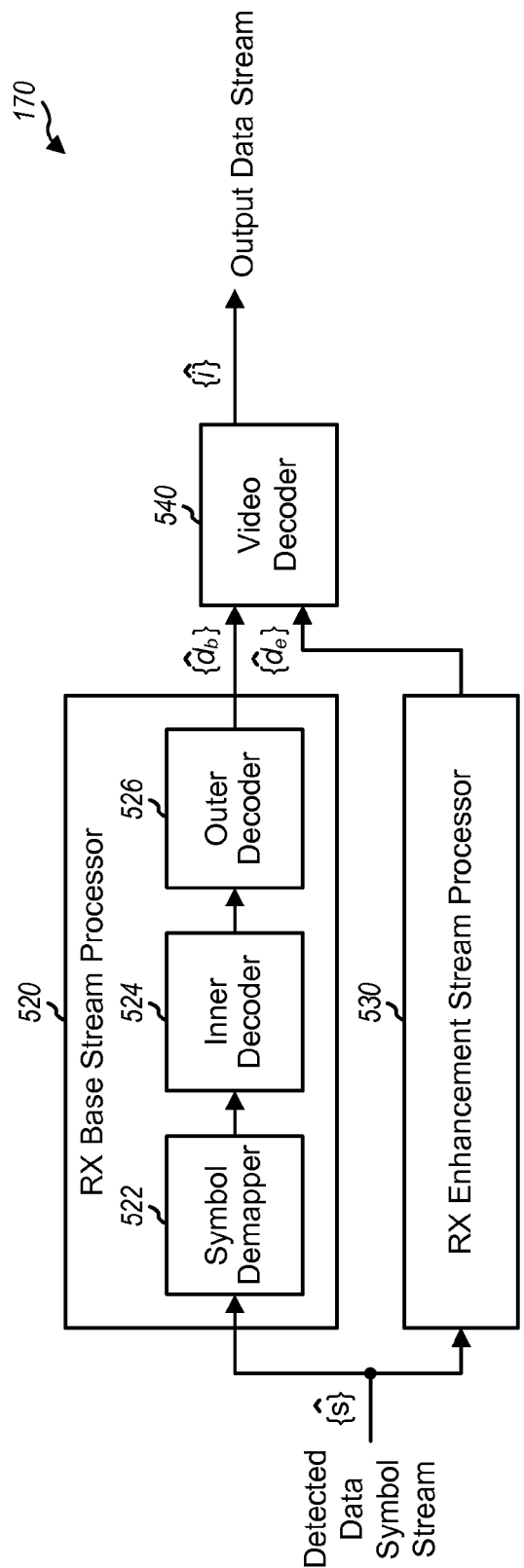
FIG. 5 is a conceptual block diagram illustrating an example of a RX data processor in the receiver.

FIG. 5 is a conceptual block diagram illustrating an example of a RX data processor at the receiver. For simplicity of presentation, FIG. 5 is limited to the processing of one video data stream for one multimedia program. Within RX data processor 170, an RX base stream processor 520 and an RX enhancement stream processor 530 receive from the demodulator 160 (see FIG. 1) code blocks of detected data symbol {ŝ}, which is an estimate of the data symbol stream {s} for the video portion.

Within the RX base stream processor 520, a symbol demapper 522 demaps the detected data symbols in the turbo encoded packets for the code blocks. The result is a series of code blocks, each having n turbo encoded packets containing log-likelihood ratios (LLRs). An inner decoder 524 processes each of the k turbo encoded packets separately, deinterleaving and decoding the LLRs to recover the video base stream {$\hat{d}_b$}. The inner decoder 524 also checks the CRC value for each of the k turbo decoded packets to determine whether an erasure has occurred. An "erasure" means that the packet could not be decoded for whatever reason, typically because the packet was either lost or corrupted during transmission over the air interface. During the inner decoding of a code block, the inner decoder 524 sends a report to the controller 190 (see FIG. 1) indicating the number of erasures for the code block. In a manner to be described in greater detail later, the controller 190 uses this report to determine whether the outer coding process should be performed. For each code block provided to the outer decoder 526, the n turbo encoded packets are deinterleaved and then decoded using, by way of example, a (n,k) Reed-Solomon code, to recover the video base stream {$\hat{d}_b$}.

A RX enhancement stream processor 530 processes the detected data symbol stream {ŝ} to recover the video enhancement stream {$\hat{d}_e$} in a manner similar to that described earlier in connection with the RX base stream processor 520. The processor 530 may use the same outer code, inner code, and modulation scheme used by the processor 520 for the base stream, or different ones.

A video decoder 540 receives the video base and enhancement streams {$\hat{d}_b$}, {$\hat{d}_e$}, performs video decompression in a complementary manner to the video compression performed at the transmitter to produce a decompressed video stream {$\hat{i}$}.

Figure 6:
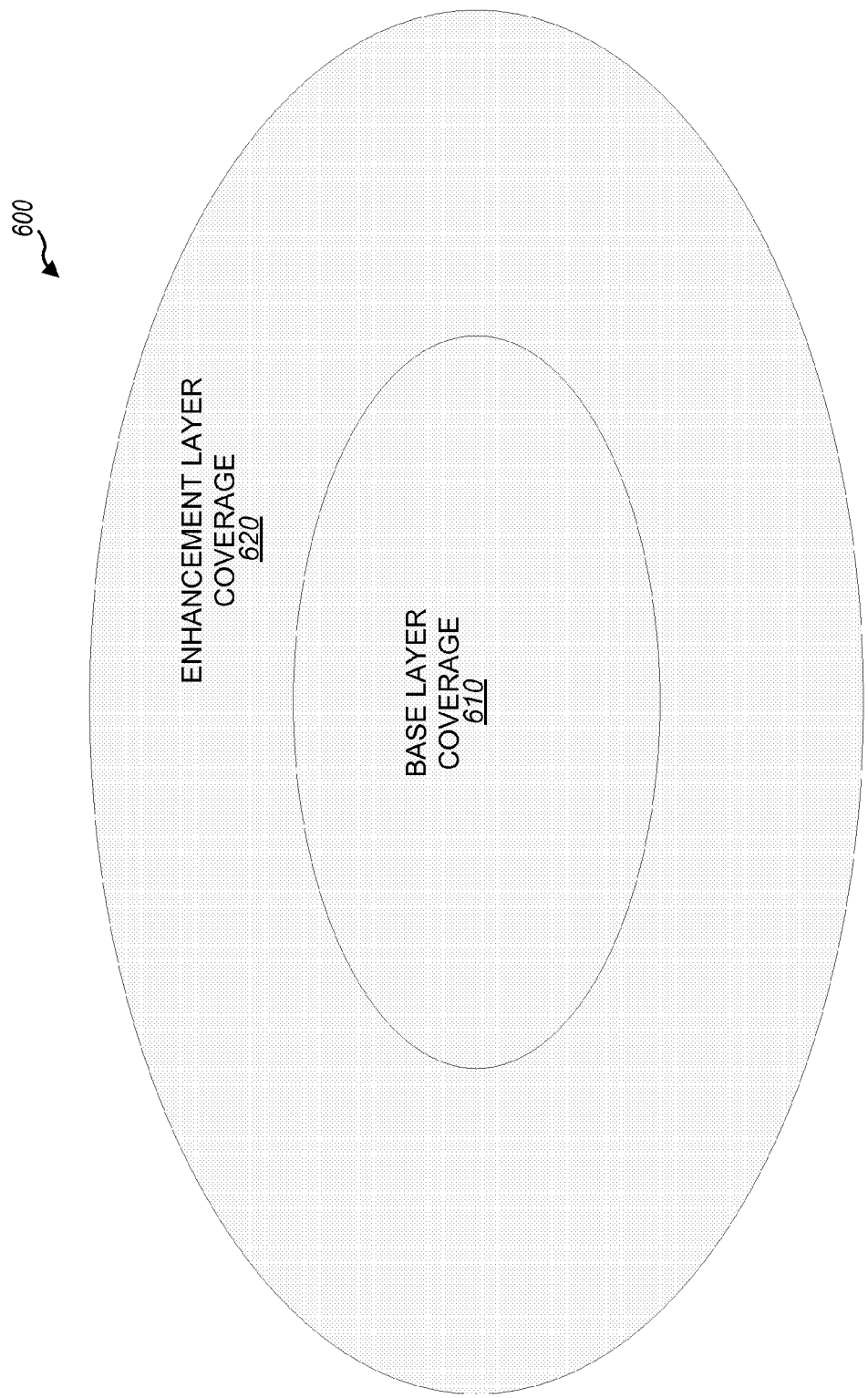
FIG. 6 is a conceptual diagram illustrating an example of the coverage region for the transmitter in a wireless communications system providing broadcast services.

FIG. 6 is a conceptual diagram illustrating an example of the coverage region for the transmitter in a wireless communications system providing broadcast services. In this example, the coverage region 600 includes an inner coverage region 610 and an outer coverage region 620. Wireless devices within the inner coverage region 610 are generally capable of receiving and processing both base and enhancement streams, while wireless devices within the outer coverage region 620 are generally capable of receiving and processing only the base stream. Under these conditions, the entire outer decoding processes may be skipped. The wireless devices within the inner coverage region 610 do not require outer decoding because there are essentially no erasures and the wireless devices in the outer coverage region 620 do not require outer decoding because there are essentially no erasures in the base stream, and the number of erasures in the enhancement stream exceed the capabilities of the outer decoder. By skipping the outer decoding process, the controller 190 (see FIG. 1) can disable at least a portion of the receiver in a wireless device (i.e., force it into the sleep mode) during the transmission of the parity blocks (e.g., the fourth sub-frame of each frame), thereby reducing processing complexity and conserving battery life.

An example will now be presented for a data symbol stream employing a (n,k) Reed-Solomon code. Returning to FIG. 4, the data symbol stream {s} comprises a series of code blocks, each containing n turbo encoded packets. Each turbo encoded packet contains modulation symbols from the base data stream superimposed with modulation symbols from the enhancement stream. M data blocks are distributed across the first three sub-frames of the frame and M parity blocks are carried in the fourth sub-frame of the frame. As discussed above, the positioning of the data and parity blocks within each sub-frame, in terms of frequency and time, is based on the allocation within the frame of the logical channel carrying the base and enhancement data streams.

The controller 190 (see FIG. 1) monitors the number of erasures in the first three sub-frames for the base and enhancement streams. The controller forces the receiver into the sleep mode during the fourth sub-frame of the frame under the following conditions: (1) zero erasures in each of the M data blocks for the base stream during the first three sub-frames of the frame, and (2) more than n−k erasures in each of the M data blocks for the enhancement stream during the first three sub-frames of the frame. Under these conditions, the outer decoding process may be skipped because there are no erasures in the base stream and the number of erasures in each of the M data blocks for the enhancement stream exceed the decoding capabilities of the outer decoder.

Figure 7:
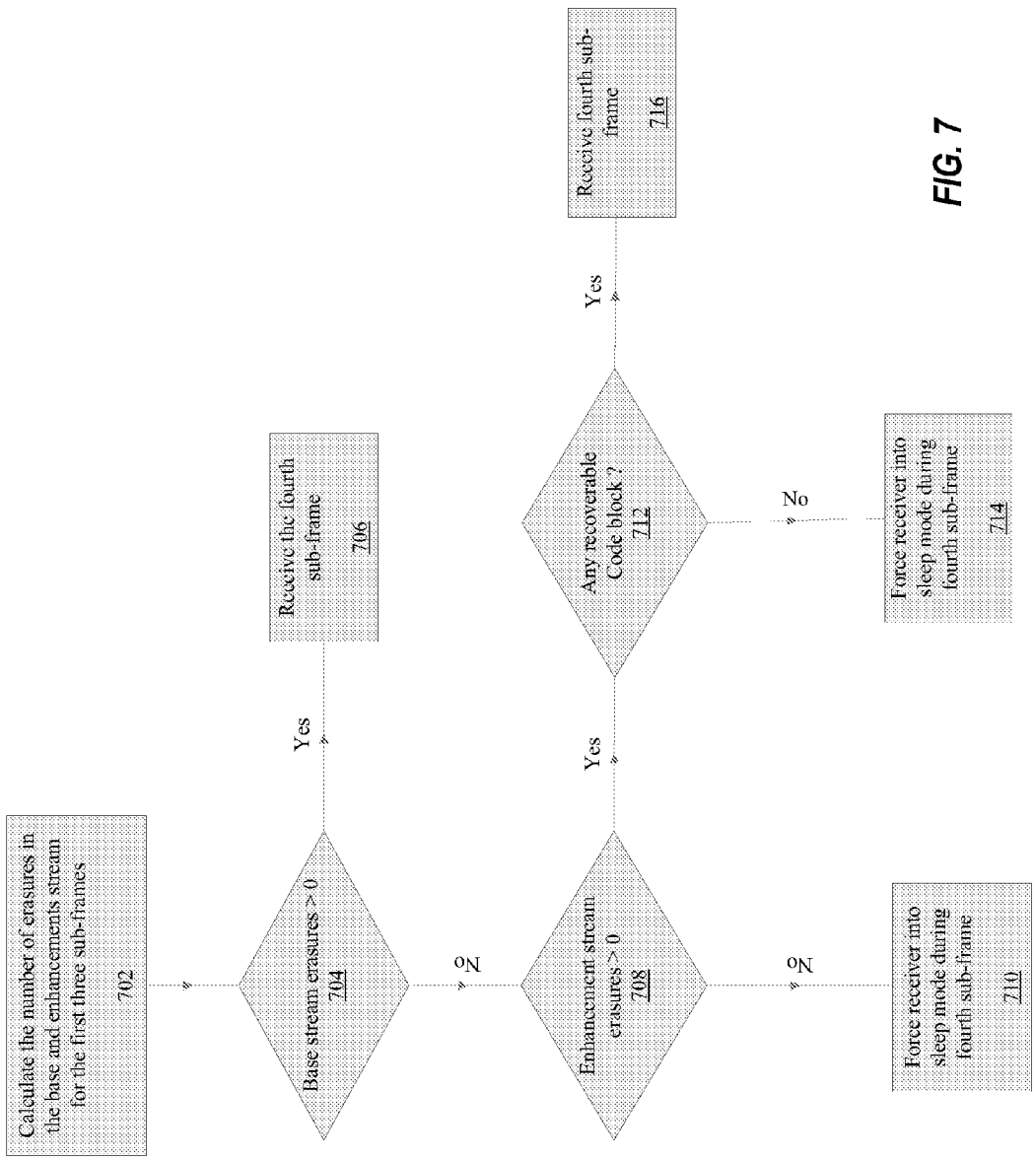
FIG. 7 is a flow diagram illustrating an example of a process to force the receiver into a sleep mode during the transmission of parity blocks.

FIG. 7 is a flow diagram illustrating this process. In step 702, the controller calculates the number of erasures in the first three sub-frames of the frame. The controller then determines, in step 704, whether there are any erasures in the base stream. If the controller detects one or more erasures, then it allows the receiver to receive the fourth sub-frame in step 706. If, however, the controller determines that there are no erasures in the base stream, then in step 708 it determines whether there are any erasures in the enhancement stream. If there are no erasures, then the controller forces the receiver into the sleep mode during the fourth sub-frame in step 710. If, on the other hand, the controller determines that the enhancement stream has one or more erasures, then it determines whether any of the code blocks are recoverable in step 712. If none of the code blocks are recoverable, the controller then forces the receiver into the sleep during the fourth sub-frame in step 714. Otherwise, the controller allows the receiver to receive the fourth sub-frame in step 716.

The conditions for skipping the outer decoding process may vary depending on the particular application and the overall design constraints imposed on the system. By way of example, with no erasures in the base stream, the controller may force the receiver into the sleep mode during the fourth sub-frame when a certain number of the M data blocks in the enhancement stream cannot be decoded during the first three sub-frames, even if some of the data blocks can be decoded. A controller may be configured, for example, to force the receiver in the sleep mode during the fourth sub-frame if it determines that at least 90% of the M data packets in the enhancement stream during the first three sub-frames have more than n−k erasures, provided there are zero erasures in the base stream. Alternatively, the controller may be configured to force the receiver into the sleep mode during the fourth sub-frame even if there are some erasures in the base stream. By way of example, the receiver can be placed in the sleep mode during the fourth sub-frame if the controller determines that during the first three sub-frames (1) at least X % of the M data blocks in the enhancement stream have more than n−k erasures, and (2) at least Y % of the M data blocks in the base stream have zero erasures.

Figure 8:
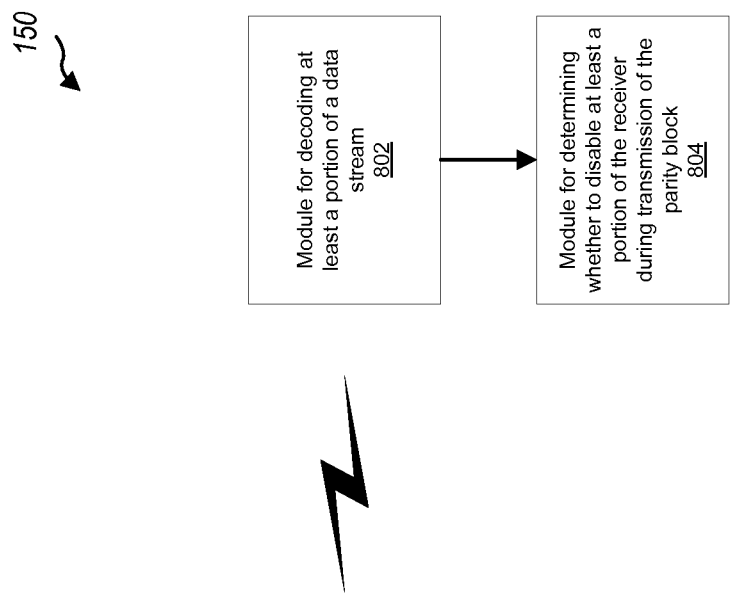
FIG. 8 is a diagram illustrating the functionality of a receiver.

FIG. 8 is a diagram illustrating the functionality of a receiver. The receiver 150 includes a module 802 for decoding at least a portion of a data stream. The data stream includes data frame carrying a code block. The code block includes a data block and a parity block. The receiver 150 also includes a module 804 for determining whether to disable at least a portion of the receiver during transmission of the parity block to the receiver when the data block contains at least one erasure.

The various illustrative logical blocks, modules, and circuits described herein may be implemented or performed with one or more processors. A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, a micro-controller, a state machine, a combination of discrete hardware components, or any combination thereof.

The various illustrative logical blocks, modules, and circuits described herein may also include machine readable medium for storing software. The machine readable medium may also include one or more storage devices, a transmission line, or a carrier wave that encodes a data signal.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A receiver, comprising:
   a decoder configured to decode at least a first stream and a second stream of a data stream, wherein the first stream comprises a first frame that includes a first code block that comprises a first data block and a first parity block, and the second stream comprises a second frame that includes a second code block that comprises a second data block and a second parity block; and a controller configured to disable a receiving portion of the receiver that receives the first stream during transmission of the first parity block to the receiver when the first data block contains a number of erasures exceeding a decoding capability of the decoder.

2. The receiver of claim 1, wherein the first frame and the second frame are combined to form a data frame transmitted to the receiver.

3. The receiver of claim 2, wherein the first stream comprises an enhancement stream or a base stream and the second stream comprises a base stream or an enhancement stream.

4. The receiver of claim 2, wherein the controller is further configured to disable said receiving portion of the receiver that receives the first stream during the transmission of the first parity block in response to one or more conditions being satisfied, the one or more conditions including the number of erasures in the first data block in the first frame exceeding the decoding capability of the decoder.

5. The receiver of claim 4, wherein the one or more conditions further include the number of erasures in the first data block in the first frame being zero.

6. The receiver of claim 2, wherein the first frame contains additional code blocks, each of the additional code blocks having a data block and a parity block, and wherein the first frame further includes a sub-frame containing the parity blocks in the first frame, the controller being further configured to disable said receiving portion of the receiver that receives the first stream during transmission of the sub-frame in response to one or more conditions being satisfied, the one or more conditions including the number of erasures in each of a threshold number of the data blocks exceeding the decoding capability of the decoder.

7. The receiver of claim 6, wherein the second frame includes a plurality of code blocks, each of the code blocks having a data block and a parity block.

8. A receiver, comprising:
means for decoding at least a first stream and a second stream of a data stream, wherein the first stream comprises a first frame that includes a first code block that comprises a first data block and a first parity block, and the second stream comprises a second frame that includes a second code block that comprises a second data block and a second parity block; and
means for disabling a receiving portion of the receiver that receives the first stream during transmission of the first parity block to the receiver when the first data block contains a number of erasures exceeding a decoding capability of the decoder.

9. The receiver of claim 8, wherein the first frame and the second frame are combined to form a data frame transmitted to the receiver.

10. The receiver of claim 9, wherein the first stream comprises an enhancement stream or a base stream and the second stream comprises a base stream or an enhancement stream.

11. The receiver of claim 9, wherein the receiver further comprising means for disabling said receiving portion of the receiver that receives the first stream during the transmission of the first parity block in response to one or more conditions being satisfied, the one or more conditions including the number of erasures in the first data block in the first frame exceeding the decoding capability of the decoding means.

12. The receiver of claim 11, wherein the one or more conditions further include the number of erasures in the first data block in the first frame being zero.

13. The receiver of claim 9, wherein the first frame contains additional code blocks, each of the additional code blocks having a data block and a parity block, and wherein the first frame further includes a sub-frame containing the parity blocks in the first frame, the receiver further comprising means for disabling said receiving portion of the receiver that receives the first stream during transmission of the sub-frame in response to one or more conditions being satisfied, the one or more conditions including the number of erasures in each of a threshold number of the data blocks exceeding the decoding capability of the decoding means.

14. The receiver of claim 13, wherein the second frame includes a plurality of code blocks, each of the code blocks having a data block and a parity block.

15. A method of processing a data stream at a receiver, the method comprising:
decoding at least a first stream and a second stream of the data stream, wherein the first stream comprises a first frame that includes a first code block that comprises a first data block and a first parity block, and the second stream comprises a second frame that includes a second code block that comprises a second data block and a second parity block; and
disabling a receiving portion of the receiver that receives the first stream during transmission of the first parity block to the receiver when the first data block contains a number of erasures exceeding the decoding capability of a decoder.

16. The method of claim 15, wherein the first frame and the second frame are combined to form a data frame transmitted to the receiver.

17. The method of claim 16, wherein the first stream comprises an enhancement stream or a base stream and the second stream comprises a base stream or an enhancement stream.

18. The method of claim 16, wherein the decoding of said at least a first stream and a second stream of the data stream is performed with a decoder, the method further comprising disabling said receiving portion of the receiver that receives the first stream during the transmission of the first parity block in response to one or more conditions being satisfied, the one or more conditions including the number of erasures in the first data block in the first frame exceeding the decoding capability of the decoder.

19. The method of claim 18, wherein the one or more conditions further include the number of erasures in the first data block in the first frame being zero.

20. The method of claim 16, wherein the first frame contains additional code blocks, each of the additional code blocks having a data block and a parity block, wherein the first frame further includes a sub-frame containing the parity blocks in the first frame, and wherein the decoding of said at least a first stream and a second stream of the data stream is performed using a decoder, the method further comprising means for disabling said receiving portion of the receiver that receives the first stream during transmission of the sub-frame in response to one or more conditions being satisfied, the one or more conditions including the number of erasures in each of a threshold number of the data blocks exceeding the decoding capability of the decoder.

21. The method of claim 20, wherein the second frame includes a plurality of code blocks, each of the code blocks having a data block and a parity block.

22. A machine-readable medium comprising instructions executable by one or more processors in a receiver, the instructions comprising:
code to decode at least a first stream and a second stream of a data stream, wherein the first stream comprises a first frame that includes a first code block that comprises a first data block and a first parity block, and the second stream comprises a second frame that includes a second code block that comprises a second data block and a second parity block; and code to disable a receiving portion of the receiver that receives the first stream during transmission of the first parity block to the receiver when the first data block contains a number of erasures exceeding a decoding capability of the decoder.

23. The machine-readable medium of claim 22, wherein the first frame and the second frame are combined to form a data frame transmitted to the receiver.

24. The machine-readable medium of claim 23, wherein the first stream comprises an enhancement stream or a base stream and the second stream comprises a base stream or an enhancement stream.

25. The machine-readable medium of claim 23, wherein the instructions further comprise code to disable said receiving portion of the receiver that receives the first stream during the transmission of the first parity block in response to one or more conditions being satisfied, the one or more conditions including the number of erasures in the first data block in the first frame exceeding the decoding capability of the decoding code.

26. The machine-readable medium of claim 25, wherein the one or more conditions further include the number of erasures in the first data block in the first frame being zero.

27. The machine-readable medium of claim 23, wherein the first frame contains additional code blocks, each of the additional code blocks having a data block and a parity block, and wherein the first frame further includes a sub-frame containing the parity blocks in the first frame, the instructions further comprising code to disable said receiving portion of the receiver that receives the first stream during transmission of the sub-frame in response to one or more conditions being satisfied, the one or more conditions including the number of erasures in each of a threshold number of the data blocks exceeding the decoding capability of the decoding code.

28. The machine-readable medium of claim 27, wherein the second frame includes a plurality of code blocks, each of the code blocks having a data block and a parity block.

29. A receiver for decoding a data stream combined by a first sub-data stream having a first data block and a first parity block and a second sub-data stream having a second data block and a second parity block, comprising:

a first processors operative to decode the first sub-data stream;

a second processor operative to decode the second sub-data stream; and a controller operative to:

disable at least a first receiving portion of the receiver during transmission of the first parity block when the first data block contains a number of erasures; and disable at least a second receiving portion of the receiver during transmission of the second parity block when the second data block contains a number of erasures.

30. The receiver of claim 29, wherein the number of erasures of the first and second data blocks is zero or exceeds the decoding capability of the first and second processors, respectively.

\* \* \* \* \*